(12) United States Patent
Bolluijt et al.

(10) Patent No.: US 6,365,677 B1
(45) Date of Patent: Apr. 2, 2002

(54) REDUCTION OF CARBONIZED PARTICLES

(75) Inventors: Piet J. Bolluijt, Dinteloord; Jasper R. Bouma, Halsteren, both of (NL); Herve Cartier, Levallois Perret (FR); Ulrich Hofmann, Gladenbach (DE); Jan P. Keulen, Ossendrecht (NL); Christian Henricus Koevoets, Roosendaal (NL); Eric Rietjens, Bergen op Zoom (NL); Peter O. Stahl, Ruesselsheim (DE); Geert Tamboer, Hoogerheide (NL); Werner Woerhle, Schiltach (DE)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 09/516,830

(22) Filed: Mar. 1, 2000

(51) Int. Cl.$^7$ .............................................. C08G 65/48
(52) U.S. Cl. ...................................................... 525/397
(58) Field of Search ......................................... 525/397

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,337,501 A | 8/1967 | Bussink et al. |
| 3,379,792 A | 4/1968 | Finholt |
| 3,428,699 A | 2/1969 | Schleimer et al. |
| 3,756,999 A | 9/1973 | Stetter et al. |
| 3,787,361 A | 1/1974 | Nakashio |
| 3,822,227 A | 7/1974 | Heinz |
| 3,876,721 A | 4/1975 | Yasui et al. |
| 3,884,882 A | 5/1975 | Caywood, Jr. |
| 4,054,612 A | 10/1977 | Yagi et al. |
| 4,147,740 A | 4/1979 | Swiger et al. |
| 4,174,358 A | 11/1979 | Epstein |
| 4,251,644 A | 2/1981 | Joffrion |
| 4,315,086 A | 2/1982 | Ueno et al. |
| 4,346,194 A | 8/1982 | Roura |
| 4,433,088 A | 2/1984 | Haaf et al. |
| 4,474,927 A | 10/1984 | Novak |
| 4,600,741 A | 7/1986 | Aycock et al. |
| 4,642,358 A | 2/1987 | Aycock et al. |
| 4,659,763 A | 4/1987 | Gallucci et al. |
| 4,826,933 A | 5/1989 | Grant et al. |
| 4,866,114 A | 9/1989 | Taubitz et al. |
| 4,873,286 A | 10/1989 | Gallucci et al. |
| 4,874,810 A | 10/1989 | Lee, Jr. et al. |
| 4,927,894 A | 5/1990 | Brown |
| 4,980,424 A | 12/1990 | Sivavec |
| 4,997,612 A | 3/1991 | Gianchandai et al. |
| 5,000,897 A | 3/1991 | Chambers |
| 5,041,504 A | 8/1991 | Brown et al. |
| 5,115,042 A | 5/1992 | Khouri et al. |
| 5,120,801 A | 6/1992 | Chambers |
| 5,534,600 A * | 7/1996 | Bailly .......................... 525/397 |
| 5,723,539 A | 3/1998 | Gallucci et al. |
| 6,107,415 A * | 8/2000 | Silvi .......................... 525/397 |

FOREIGN PATENT DOCUMENTS

| | | |
|---|---|---|
| EP | 0 685 527 B1 | 3/1997 |
| JP | 4250005 | 9/1992 |
| JP | 7053713 | 2/1995 |

\* cited by examiner

Primary Examiner—Edward J. Cain

(57) ABSTRACT

The above described deficiencies and drawbacks are overcome by the process for making poly(arylene ether)-polyamide compositions which comprise about 10 weight percent (wt %) to about 90 wt % poly(arylene ether), about 90 wt % to about 10 wt % polyamide, about 0.01 wt % to about 10 wt % compatibility modifier, and optionally other additives known in the art. The process comprises several components which can be employed singly or in combination, namely: utilizing resins and additives that are substantially free of gaseous oxygen (air-free; e.g. less than about 1.0 vol % oxygen preferred, and less than about 0.5 vol % oxygen especially preferred, and less than about 0.05 vol % especially preferred); melting and compounding under an atmosphere which is substantially air-free; adding up to 20 wt % of polyamide to the poly(arylene ether) before compounding; when employing an extruder with an atmospheric vent, operating with the atmospheric vent open; and performing the injection molding under an inert atmosphere.

35 Claims, 1 Drawing Sheet

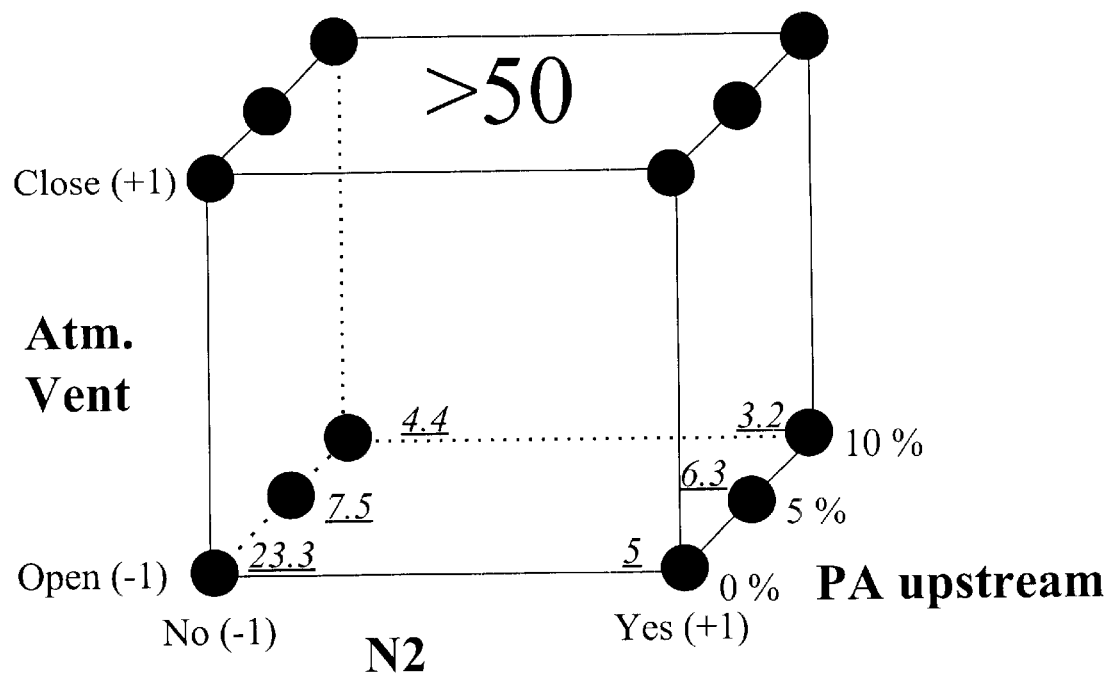
FIGURE

REDUCTION OF CARBONIZED PARTICLES

TECHNICAL FIELD

The present invention relates to a method for making poly(arylene ether)-polyamide compositions.

BACKGROUND OF THE INVENTION

Poly(arylene ether) resins are characterized by a unique combination of chemical, physical and electrical properties over a broad temperature range. This combination of properties renders poly(arylene ether)s suitable for a wide range of applications. However, the usefulness of poly(arylene ether) resins is limited as a consequence of their poor processability, impact resistance and chemical resistance. Poly(arylene ether)-polyamide compositions, as disclosed by Finholt (U.S. Pat. No. 3,379,792), overcame processability issues. However, the advantages of the Finholt invention are limited by the fact that when the concentration of the polyamide exceeds 20 weight percent (wt %), appreciable losses in other physical properties result. Specifically, there is no, or at best poor, compatibility between the poly(arylene ether) and the polyamide such that phase separation of the resin occurs on molding or the molded article is inferior in mechanical properties.

Compatibilized poly(arylene ether)-polyamide compositions have been produced utilizing a variety of base resins and compatibilizing systems. These thermoplastic products offer a wide range of beneficial properties which take advantage of the strengths of the basic resins while improving upon the weaknesses of each. Among the most useful properties of compatibilized poly(arylene ether)-polyamide compositions are excellent heat resistance, chemical resistance, impact strength, hydrolytic stability and dimensional stability. Such compatibilized poly(arylene ether)-polyamide compositions have found great utility in exterior automotive applications such as body panels. Examples of compatibilized poly(arylene ether)-polyamide compositions can be found in U.S. Pat. No. 4,315,086.

Polyfunctional compatibility modifiers can facilitate formation of a copolymer of the poly(arylene ether) and polyamide components. Such a reaction has been readily shown to take place under the time, temperature and shear conditions of typical thermoplastic extrusion processes. Copolymer produced in this fashion may serve as a melt surfactant which stabilizes the morphology of the resinous components of the system. Compatibility may also be achieved by improved interfacial adhesion of the resinous components.

Methods for making compatibilized poly(arylene ether)-polyamide compositions are well known in the prior art. U.S. Pat. No. 5,000,897 to Chambers, discloses a process for making a poly(arylene ether) and polyamide composition which is comprised of several steps. Poly(arylene ether) resin is blended with a first polyamide component together with a polyfunctional compatibility modifier, an optional rubber impact modifier and typical stabilizers, if desired. This mixture is fed to the feedthroat of an extruder which begins compounding the ingredients to provide an intermediate poly(arylene ether)-polyamide product. After the first compounding step, the second polyamide component is added to the intermediate poly(arylene ether)-polyamide composition, and additional compounding takes place. The compatibilized poly(arylene ether)-polyamide final product, which, in this instance, is the extrudate of the compounding process, is dried and pelletized by conventional means to provide thermoplastic resin products.

Poly(arylene ether)-polyamide compositions are usually amenable to many different types of processing operations, such as extrusion, compression molding and injection molding. However under certain conditions, final products resulting from the operations exhibit some imperfections. These imperfections fall into two classes, solid particles visible on the surface and flow disturbance artifacts such as pinholes, "V" shape imperfections, and sinkmarks visible as dents in the surface. These imperfections, which often become magnified when painted, are caused by carbonized particles (also known as pits) which are formed during processing operations such as extrusion and injection molding. Articles formed from poly(arylene ether)-polyamide compositions with surface imperfections are typically rejected, thereby increasing the manufacturing cost.

There is a continuing need to make poly(arylene ether)-polyamide compositions and articles from said composition with a decreased number of carbonized particles and a concurrently decreased number of surface imperfections.

SUMMARY OF THE INVENTION

A process to produce a poly(arylene ether)-polyamide composition, comprising creating and maintaining a substantially inert atmosphere in an extruder; combining poly(arylene ether) resin and an optional compatibility modifier in the extruder to form a mixture; compounding the mixture; and adding polyamide to the mixture and further compounding to form the poly(arylene ether)-polyamide composition.

Alternatively the process for producing a poly(arylene ether)-polyamide composition comprises creating and maintaining a substantially inert atmosphere in an extruder; combining poly(arylene ether) resin, an optional compatibility modifier, and up to about 20 wt % polyamide resin in the extruder to form a mixture; compounding the mixture; and adding additional polyamide resin to the compounded mixture and further compounding to form the poly(arylene ether)-polyamide composition.

Also part of the invention is a process for forming an article from a poly(arylene ether)-polyamide composition, comprising creating and maintaining an inert atmosphere in a molding device; adding the poly(arylene ether)-polyamide composition to the molding device; melting the poly(arylene ether)-polyamide composition; forcing the molten composition into a mold; and cooling the mold and releasing the resulting article.

BRIEF DESCRIPTION OF THE DRAWINGS

The FIGURE is meant to illustrate, not limit, the present invention.

The FIGURE is a cube plot of the number of pits per plaque for the Design of Experiments set up described in Example 11 and Table 5, based upon the use of the atmospheric vent, a nitrogen purge, and/or the introduction of polyamide upstream.

DETAILED DESCRIPTION OF THE INVENTION

The above described deficiencies and drawbacks are overcome by a process for making poly(arylene ether)-polyamide compositions which utilize about 10 weight percent (wt %) to about 90 wt % poly(arylene ether), about 90 wt % to about 10 wt % polyamide, optionally about 0.01 wt % to about 15 wt % compatibility modifier, and other additives known in the art, based on the total weight of the composition. The process comprises several components which can be employed singly or in combination, namely: utilizing resins and additives that are substantially free of gaseous oxygen (air-free, e.g. less than about 1.0 volume percent (vol %) oxygen preferred, and less than about 0.5 vol % oxygen more preferred, and less than about 0.05 vol % especially preferred); melting and compounding under an atmosphere which is air-free; adding up to about 20 wt % of polyamide to the poly(arylene ether) before compounding ("split-feeding"); operating with the atmospheric vent open when employing an extruder with an atmospheric vent; and performing injection molding under an inert atmosphere.

The process comprises: flushing the poly(arylene ether) resin with an inert gas to obtain a resin which is air-free or alternately, employing a poly(arylene ether) resin which is already air-free; adding the poly(arylene ether), optionally a compatibility modifier, and/or other additives and up to about 20 wt % of polyamide based on the total weight of the composition to an extruder under an inert atmosphere; melting and compounding the above components; adding the remaining polyamide; and further compounding. The resulting polymer can be pelletized or otherwise processed by any method known in the art, with underwater pelletization preferred. Preferably the whole process, from production of raw materials to compounding, extruding, pelletization and molding is performed under a substantially inert atmosphere.

Poly(arylene ether)

All conventional poly(arylene ether)s can be employed with the present invention. The term includes poly(arylene ether) and copolymers, graft copolymers, and ionomers thereof; block copolymers of alkenyl aromatic compounds, vinyl aromatic compounds and poly(arylene ether); and combinations comprising at least one of the foregoing. Poly(arylene ether)s per se, are known polymers comprising a plurality of structural units of the formula (I):

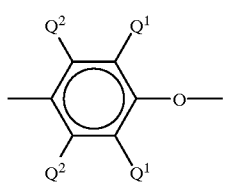

(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. The poly(arylene ether)s further include combinations comprising at least one of the above.

It will be apparent to those skilled in the art from the foregoing that the poly(arylene ether) contemplated for use in the present invention include all those presently known, irrespective of variations in structural units or ancillary chemical features. Examples of poly(arylene ether)s and methods for their production are disclosed in U.S. Pat Nos. 3,306,874; 3,306,875; 3,257,357; 3,257,358; 3,337,501 and 3,787,361.

The amount of poly(arylene ether) used in the composition can be about 10 to about 90 wt %, with about 20 to about 80 wt % preferred, and about 30 to about 60 wt % especially preferred.

Polyamide

The polyamide resins include a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4, nylon-4,6, nylon-12, nylon-6,10, nylon 6,9, and others such as the amorphous nylons, may be useful for particular poly(arylene ether)-polyamide applications. Mixtures of various polyamides, as well as various polyamide copolymers, are also useful, with nylon-6,6, especially preferred.

The polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

It is also to be understood that the use of the term "polyamides" herein and in the appended claims is intended to include the toughened or super tough polyamides. Super tough polyamides, or super tough nylons, as they are more commonly known, such as those available commercially, e.g. from E.I. duPont under the trade name Zytel ST, or those prepared in accordance with U.S. Pat. No. 4,174,358 to Epstein; U.S. Pat No. 4,474,927 to Novak; U.S. Pat. No. 4,346,194 to Roura; and U.S. Pat. No. 4,251,644 to Jeffrion, among others and combinations comprising at least one of the foregoing, can be employed.

Generally, these super tough nylons are prepared by blending one or more polyamides with one or more polymeric or copolymeric elastomeric toughening agents. Suitable toughening agents are disclosed in the above-identified U.S. Patents as well as in U.S. Pat. No. 3,884,882 to Caywood, Jr., U.S. Pat. No. 4,147,740 to Swiger, and Gallucci et al., "Preparation and Reactions of Epoxy-Modified Polyethylene", J. Appl. Poly. Sci., V 27, pp. 425–437 (1982) (which are herein incorporated by reference). Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The amount of polyamide utilized in the composition can be about 10 to about 90 wt %, with about 20 to about 80 wt % preferred, and about 30 to about 60 wt % especially preferred.

Compatibility Modifier

The two fold purpose for using compatibility modifiers is to improve the physical properties of the poly(arylene ether)-polyamide resin, as well as to enable the use of a greater proportion of the polyamide component. However, a compatibility modifier may not be necessary when all of a portion of the poly(arylene ether) is an ionomer. When used herein, the expression "compatibility modifier" refers to those polyfunctional compounds which interact with the poly(arylene ether), the polyamide, or both. This interaction may be chemical (e.g. grafting) or physical (e.g. affecting the surface characteristics of the dispersed phases). In either instance the resulting poly(arylene ether)-polyamide composition appears to exhibit improved compatibility, particularly as evidenced by enhanced impact strength, mold knit line strength and/or elongation. As used herein, the expression "compatibilized poly(arylene ether)-polyamide resin" refers to those compositions which have been physically or chemically compatibilized with a modifier as discussed above, as well as those compositions which are physically compatible without such agents, as taught in U.S. Pat. No. 3,379,792.

Examples of the various compatibilizing modifiers that may be employed include: a) liquid diene polymers, b) epoxy compounds, c) oxidized polyolefin wax, d) quinones, e) organosilane compounds, and f) polyfunctional compounds. Functionalized poly(arylene ether), as described, are obtained by reacting one or more of the previously mentioned compatibility modifiers with poly(arylene ether).

Liquid diene polymers (a) include homopolymers of a conjugated diene with at least one monomer selected from other conjugated dienes; vinyl monomer, e.g. styrene and alphamethyl styrene; olefins, e.g. ethylene, propylene, butene-1, isobutylene, hexene-1, octene-1 and dodecene-1, and mixtures thereof, having a number average molecular weight of about 150 to about 10,000, preferably about 150 to about 5,000. These homopolymers and copolymers can be produced by the methods described in, for example, U.S. Pat. Nos. 4,054,612; 3,876,721 and 3,428,699 and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene), and combinations comprising at least one of the foregoing.

Epoxy compounds (b) include: (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g., ethylene glycol, propylene glycol, butylene glycol, polyethylene glycol, polypropylene glycol, pentaerythritol and trimethylolethane, and the like) and epichlorohydrin; (3) glycidyletherified products of monohydric alcohols and monohydric phenols including phenyl glycidylether, butyl glycidyl ether and cresyl glycidylether; (4) glycidyl derivates of amino compounds, for example, the diglycidyl derivate of aniline; (5) epoxidized products of higher olefinic or cycloalkene, or natural unsaturated oils (e.g. soybean) as well as of the foregoing liquid diene polymers; and combinations comprising at least one of the foregoing.

Oxidized polyolefin waxes (c) are well known and an illustrative description thereof and processes for the production of the same are found in U.S. Pat. Nos. 3,822,227 and 3,756,999. Generally, these are prepared by an oxidation or suspension oxidation of polyolefin.

Quinone compounds (d) are characterized as having in the molecule of the unsubstituted derivative at least one six-membered carbon ring; at least two carbonyl groups in the ring structure, both of which may be in the same or, if more than one ring, different rings, provided that they occupy positions corresponding to the 1,2- or 1,4 -orientation of the monocyclic quinone; and at least two carbon-carbon double bonds in the ring structure, the carbon-carbon double bounds and carbonyl carbon-oxygen double bonds in the ring structure, the carbon-carbon double bonds and carbonyl carbon-oxygen double bonds being conjugated with respect to each other. Where more than one ring is present in the unsubstituted quinone, the rings may be fused, non-fused, or both: non-fused rings may be bound by a direct carbon-carbon double bond or by a hydrocarbon radical having conjugated unsaturation such as —C=C—C=C—.

Substituted quinones may also be used. The degree of substitution, where substitution is desired, may be from one to the maximum number of replaceable hydrogen atoms. Exemplary of the various substituents that may be present on the unsubstituted quinone structures include halogen (e.g. chlorine, bromine, fluorine, etc.); hydrocarbon radicals including branched and unbranched, saturated and unsaturated alkyl, aryl, alkyl aryl and cycloalkyl radicals and halogenated derivatives thereof; and similar hydrocarbons having hetero atoms therein, particularly oxygen, sulfur, or phosphorous and wherein the same connects the radical to the quinone ring (e.g. oxygen link).

Examples of suitable quinones include 1,2- and 1,4-benzoquinone; 2,6-diphenyl quinone; tetramethyldiquinone; 2,2'- and 4,4'-diphenoquinone; 1,2-,1,4- and 2,6-naphthoquinone; tetrachlorobenzoquinone; 2-chloro-1,4 -benzoquinone; and 2,6-dimethyl benzoquinone.

Organosilane compounds (e) suitable as compatibility modifiers are characterized as having in the molecule (1) at least one silicon atom bonded to a carbon through an oxygen link and (2) at least one carbon-carbon double bond or carbon-carbon triple bond and/or a functional group selected from an amine group or a mercapto group provided that the functional group is not directly bonded to the silicon atom. In such compounds, the C—O—Si component is generally present as an alkoxyl or acetoxy group bonded directly to the silicon atom, wherein the alkoxy or acetoxy group generally has less than 15 carbon atoms and may also contain hetero atoms. Additionally, there may also be more than one silicon atom in the compound, such multiple silicon atoms, if present, being linked through an oxygen link (e.g. siloxanes), a silicon bond, or a bifunctional organic radical (e.g. methylene or phenylene groups), or the like.

Examples of suitable organosilane compounds include: gamma amino propyltriethoxy silane, 2-(3-cyclohexanyl) ethyl trimethoxy silane; 1,3-divinyl tetraethoxy silane, vinyl tris-(2-methoxyethoxy)silane, 5-bicycloheptenyl triethoxy silane, and gamma mercapto propyl trimethoxy silane.

Polyfunctional compounds (f) which may be employed as a compatibility modifier are of three types. The first type of polyfunctional compounds are those having in the molecule both (1) a carbon-carbon double bond or a carbon-carbon triple bond and (2) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30); unsaturated amines resulting from replacing from replacing the hydroxyl group(s) of the above unsaturated alcohols with $NH_2$ groups; and functionalized diene polymers and copolymers; and the like. Maleic anhydride and fumaric acid are preferred.

The second group of polyfunctional compatibility modifiers suitable for use herein are characterized as having both (1) a group represented by the formula (OR) wherein R is hydrogen or an alkyl, aryl, acyl or carbonyl dioxy group and (2) at least two groups each of which may be the same or different selected from carboxylic acid, acid halide, anhydride, acid halide anhydride, ester, orthoester, amide, imido, amino, and various salts thereof. Typical of this group of compatibility modifiers are the aliphatic polycarboxylic acids, acid esters and acid amides represented by the formula:

$$(R'O)_m R^V (COOR'')_n (CONR'''R^{IV})_s$$

wherein $R^V$ is a linear or branched chain, saturated aliphatic hydrocarbon of from 2 to 20, preferably 2 to 10, carbon atoms; $R^I$ is hydrogen or an alkyl, aryl, acyl or carbonyl dioxy group of 1 to 10, preferably 1 to 6, most preferably 1 to 4, carbon atoms, preferably hydrogen; each $R''$ is independently hydrogen or an alkyl or aryl group from 1 to 20 carbon atoms, preferably from 1 to 10 carbon atoms; each $R'''$ and $R^{IV}$ are independently hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein (OR') is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid, and the like; including the various commercial forms thereof, such as for example, the anhydrous and hydrated acids. Of these, citric acid is another of the preferred compatibility modifiers. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Especially preferred derivates are the salts thereof, including the salts with amines and/preferably, the alkali and alkaline metal salts. Exemplary of suitable salts include calcium malate, calcium citrate, potassium malate, and potassium citrate.

The third group of polyfunctional compatibility modifiers suitable for use herein are characterized as having in the molecule both (1) an acid halide group, most preferably an acid chloride group and (2) at least one carboxylic acid, anhydride, ester, epoxy, orthoester, or amide group, preferably a carboxylic acid or anhydride group. Examples of compatibility modifiers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibility modifiers of this group be prereacted with at least a portion of the poly (arylene ether) whereby the compatibility modifier is a poly(arylene ether)-functionalized compound.

The foregoing compatibility modifiers are more fully described in U.S. Pat. Nos. 4,315,086; 4,600,741; 4,642,358; 4,826,933; 4,927,894; 4,980,424; 5,041,504; and 5,115,042.

The foregoing compatibility modifiers may be used alone or in various combinations comprising at least one of the above mentioned compatibility modifiers. Furthermore, they may be added directly to the melt blend or pre-reacted with either or both the poly(arylene ether) and polyamide, as well as with other resinous materials employed in the preparation of the compositions. With many of the foregoing compatibility modifiers, particularly the polyfunctional compounds, even greater improvement in compatibility is found where at least a portion of the compatibility modifier is pre-reacted, either in the melt or in a solution of a suitable solvent, with all or a part of the poly(arylene ether). It is believed that such pre-reacting may cause the compatibility modifier to react with the polymer and, consequently, functionalize the poly (arylene ether) as noted above. For example, the poly (arylene ether) may be pre-reacted with maleic anhydride to form an anhydride functionalized poly(arylene ether) which has improved compatibility with the polyamide compared to a non-functionalized poly(arylene ether).

Where the compatibility modifier is employed in the preparation of the compositions, the initial amount used will be dependent upon the specific compatibility modifier chosen and the specific polymeric system to which it is added. The amount of compatibility modifier used should be sufficient to prevent phase separation of the poly(arylene ether) and polyamide. The typical amounts are up to about 10 wt %, with about 0.05 to about 5.0 wt % preferred, and about 0.1 to about 3 wt % especially preferred.

It is possible to use in the composition any other known compatibilization system. Other systems have been described for example in U.S. Pat. No. 4,866,114.

Additives

The composition can also include effective amounts of at least one additive selected from impact modifiers, release agents, stabilizers, organic and/or inorganic fillers, conductive agents, UV stabilizers, anti-oxidants, flame retardants, drip retardants, dyes, pigments, colorants, stabilizers, small particle mineral (such as clay, mica, talc and the like), antistatic agents, plasticizers, lubricants, and mixtures comprising at least one of the above mentioned additives. These additives are known in the art, as are their effective levels and methods of incorporation. Effective amounts of the additives vary widely, but they are usually present in an amount up to about 50 wt % or more, based on the weight of the entire composition. Especially preferred additives include hindered phenols, thio compounds and amides derived from various fatty acids. The preferred amounts of these additives generally ranges up to about 3 wt %.

Especially useful are additives for conductivity: carbon black, carbon fibrils, carbon fibers, carbon nanofibers, carbon nanotubes, carbon particles, and combinations comprising at least one of the above mentioned additives.

The composition comprising the above mentioned components can be prepared in numerous fashions. As described earlier, the process comprises several components, which can be employed singly or in combination. The general procedure comprises: introducing the poly(arylene ether) resin, preferably air free, optionally up to 20 wt % polyamide resin, with up to about 15 wt % preferred, and about 5 to about 10 wt % especially preferred, and optionally a compatibility modifier and other additives, to an extruder or similar mixing device, preferably with an inert atmosphere, to form a mixture. The mixture is melted and compounded, preferably under an inert atmosphere, prior to adding the remaining polyamide. When employing an extruder with an atmospheric vent, as described below, it is preferable to operate with the atmospheric vent open. The remaining polyamide is added, preferably under an inert atmosphere, and the resulting mixture is then further melted, compounded, and finally palletized preferably by underwater pelletization, or otherwise finally processed by any method known in the art.

Air free poly(arylene ether) can be obtained by flushing the poly(arylene ether) particles with an inert gas a sufficient number of times such that the resin is substantially free of gaseous oxygen. Inert gases include all gases which are unreactive towards poly(arylene ether), polyamide or other components of the composition. Possible inert gases include hydrogen, helium, neon, argon, nitrogen, carbon dioxide, and the like, and mixtures comprising at least one of the above mentioned gases, with nitrogen preferred. Poly (arylene ether) particles are porous and as a result gaseous oxygen can infiltrate the interior of the particles. Flushing the particles removes this oxygen which can cause oxidation of the poly(arylene ether) and therefore the formation of carbon particles. As stated earlier, carbon particles cause surface imperfections.

The extruder preferably has an inert atmosphere obtained by flushing the extruder with an inert gas so as to substantially remove the gaseous oxygen contained within. The inert atmosphere is preferably maintained during addition of the above mentioned components by a continuing flow of inert gas. The flow rate can be up to or exceeding about 20 liters of inert gas per kilogram of poly(arylene ether) (1 $N_2$/kg PPE), with about 1 liter inert gas/kg poly(arylene ether) to about 15 liters inert gas/kg poly(arylene ether) preferred, and about 6 liters inert gas/kg poly(arylene ether) to about 13 liters inert gas/kg poly(arylene ether) especially preferred. The flow rates of the various components, which is determined by the screw design and geometry of the extruder, can be determined by an artisan without undue experimentation.

Possible extruders include all conventional devices capable of intimately mixing the components and maintaining the desired environment, for example single screw, twin screw or other multiple screw extruders, as well as other mixing devices such as kneaders and the like capable of effectively mixing the composition. Due to mixing requirements and environmental controls, an extruder having at least two feed ports with an atmospheric vent there between is preferred, with an extruder having at least two feedports, an atmospheric vent and at least one vacuum vent especially preferred.

In the extruder, the resin(s), additives and optional modifiers are intimately mixed at, a temperature sufficient to melt and compound the poly(arylene ether), e.g. typically about 250° C. to about 320° C., and preferably about 275° C. to about 305° C. The remaining polyamide is then added and the mixture is further mixed so as to obtain the desired product. The resulting polymer is then put through a die, roller, or other final processor, and formed into pellets, sheets, a web or the like, by any method known in the art, with underwater pelletization preferred.

In order to further reduce the presence of oxygen, the various initial components, e.g. the poly(arylene ether) resin, the portion of the polyamide resin, compatibility modifier, and optional impact modifier and other additives, can be premixed. This mixture can then be flushed with an inert gas so as to obtain a mixture which is substantially free of gaseous oxygen. The flushed mixture is then added to the extruder or other appropriate mixing device, with an inert atmosphere under the flow of an inert gas as described above. From the extruder the mixture is pelletized, formed into a sheet, or otherwise processed as is conventional.

The processed mixture can be utilized to form various articles, such as automotive parts. One technique of forming these parts comprises injection molding; a method commonly utilized to form articles from polymer resins. This process involves adding the mixture to a feed hopper, heating the mixture to a temperature sufficient to melt the mixture and forming the mixture into the desired shape by forcing it into a mold. Again, to further prevent the formation of pits, it is preferable to use inert gas(es) to create and maintain an inert atmosphere over the mixture during this processing. The preferred inert atmosphere during article formation comprise the use of inert gas as described above, with the use of nitrogen and hydrogen more preferred. The nitrogen-hydrogen mixture can be about 90 volume percent (vol %) to about 99 vol % nitrogen, with about 93 vol % to about 98 vol % preferred. Other conventional further processing techniques can also be employed.

All patents cited are incorporated herein by reference. The invention is further illustrated by the following non-limiting examples.

EXAMPLES

In the following examples a WP-28 Werner and Pfleiderer twin screw extruder was used with a main feeder disposed at the front-end of the extruder and a second feeder located approximately halfway down the extruder with an atmospheric vent located between the two feeders and a vacuum vent located between the downstream feeder and the die of the extruder. Nitrogen was introduced via a pipe at the bottom of the main feeder to flush the extruder and maintain the nitrogen atmosphere during the addition of ingredients. The nitrogen flow rate was monitored with a flow meter. The extruder was operated using the parameters defined in Table 1. Feeder % is the percentage of the total throughput of the extruder. The poly(arylene ether)-polyamide composition comprised about 50 wt % poly(arylene ether) and additives and about 50 wt % polyamide. Molding was done on a KM350, forming DIN A5 plaques for molding with inert atmosphere while for the standard molding conditions 4 cm×4 cm plaques were used. The 4 cm×4 cm plaques were formed by injection molding with a low injection speed and the plaque was not completely filled. Low injection speed is defined as the minimal speed of injection required to obtain a good quality plaque. The plaques were not completely filled in order to improve the visibility of the defect. Incom plete filling makes the carbonized particles surface at the flow end of the plaque.

TABLE 1

| Temperature settings | |
|---|---|
| Z1 | 215° C. |
| Z2 | 280° C. |
| Z3 | 300° C. |
| Z4 | 290° C. |
| Z5 | 290° C. |
| Z6 | 290° C. |
| Z7 | 290° C. |
| Z8 | 290° C. |
| die | 310° C. |
| Machine Settings | |
| Screw Speed (rpm) | 300 |
| Throughput (kg/h) | 10 |
| Feeder 1 (%) | 52.3 |
| Feeder 2 (%) | 47.7 |
| Vacuum vent | Full |
| Atmospheric vent | Open |
| Read out values | |
| Tmelt | 323° C. |
| Torque (%) | 52 |

The plaques were evaluated for pits by two methods. The first method involved a visual inspection and quantification of the number of surface defects. The second method was a filtration test. The plaque was dissolved in a mixture of chloroform and trifluoroacetic acid. The solution was then filtered and the amount of insoluble was evaluated using automatic image analysis software. The method of evaluation is also known as the insolubles test.

Examples 1–3

Examples 1–3 use the same procedure with varying nitrogen flow rates. No polyamide was introduced through the first feeder of the extruder. 3.67 kilograms (kg) of poly(arylene ether) and additives, 0.8 kg of styrene ethylene propylene, 0.7 kg of styrene ethylene butylene styrene, and 0.65 kg of citric Acid were introduced to the main feeder with nitrogen flow. 4.8 kg of polyamide were introduced at the second feeder and processing continued. The resulting composition was then pelletized and formed into plaques. The plaques were evaluated for pits and insolubles as shown in Table 2. The nitrogen flow rates for Examples 1–3 were 1.2 liter per kg (l/kg), 5.5 /kg, and 11.5 l/kg, respectively. The control material was made without nitrogen flow.

TABLE 2

| Example | Control | 1 | 2 | 3 |
|---|---|---|---|---|
| Number of pits per plaque | 20 | 5 | 4.8 | 2.3 |
| Number of insolubles | 3294 | 1151 | 1066 | 637 |

Examples 4–5

3.67 kg of poly(arylene ether), 0.65 kg of citric acid, 0.8 kg of styrene ethylene propylene, and 0.7 kg of styrene ethylene butylene styrene were introduced to the main feeder which had been flushed with nitrogen and had a continuing nitrogen flow of 1.2 liters per minute (l/min). 4.8 kg of polyamide was introduced at the second feeder and processing continued. The resulting composition was then pelletized and formed into 4 cm×4 cm plaques. The plaques were evaluated for pits and insolubles as shown in Table 3. In Example 4 the poly(arylene ether) was not flushed. In Example 5 the poly(arylene ether) was flushed five times with nitrogen prior to adding to the extruder.

TABLE 3

| Examples | Control | 4 | 5 |
|---|---|---|---|
| Number of pits per plaque | 20 | 4.2 | 3.2 |
| Number of insolubles | 3294 | 1151 | 500 |

Examples 6–10

3.67 kg of poly(arylene ether) and additives, 0.8 kg of styrene ethylene propylene, 0.7 kg of styrene ethylene butylene styrene, and 0.65 kg of citric acid was introduced to the main feeder. Amounts of polyamide added at the main feeder varied by experiment (see Table 4 for details) with the total amount of polyamide added kept constant at 4.8 kg. The remaining polyamide was introduced at the second feeder and processing continued. The resulting compositions were then pelletized and formed into plaques. The plaques were evaluated for pits and insolubles. Results are shown in Table 4.

TABLE 4

| Examples | Control | 6 | 7 | 8 | 9 | 10 |
|---|---|---|---|---|---|---|
| PA introduced at main feeder (wt %) | 0 | 1 | 5 | 10 | 15 | 25 |
| Number of pits per plaque | 20 | 11 | 5 | 4.2 | 6.5 | 22 |
| Number of insolubles per plaque | 3294 | 1480 | 1364 | 1072 | — | — |

Example 11

The effect of the position of the atmospheric vent (open or closed) was examined in a Design Of Experiment Setup. Conventionally all compounding is performed with the atmospheric vent closed in contrast to the preceding examples in which the atmospheric vent was open. The Design of Experiment Setup is a tool to evaluate and compare experimental results of a process when different parameters are varied. The Design of Experiment Setup looked at the influence of polyamide ratio (main feeder/second feeder), position of the atmospheric vent, and nitrogen atmosphere. Assignments of the key parameters are shown in Table 5, with the Figure graphically depicting the experiments as defined in the Design of Experiments. FIG. 1 clearly shows the beneficial effects of split feeding the polyamide, compounding under nitrogen and operating with the atmospheric vent open. It is also clear from the Figure that a combination of parameters results in a greater reduction of in the number of pits and insolubles.

TABLE 5

| Key Parameters | | |
|---|---|---|
| Polyamide split-feeding | 0%-5%-10% | −1/0/1 |
| Nitrogen | No-Yes | −1/1 |
| Atmospheric vent | Open-Closed (−10 mbar)* | −1/1 |

*: same as in manufacturing

Examples 12–13

A molding trial was done on a KM350 with a compatibilized poly(arylene ether)-polyamide composition molding DIN A5 plaques using the conditions shown in Table 6.

TABLE 6

| | |
|---|---|
| Screw diameter | 60 millimeters |
| Z1 temperature | 270° C. |
| Z2 temperature | 280° C. |
| Z3 temperature | 290° C. |
| Z4 temperature | 295° C. |
| Melt temperature | 310° C. |
| Injection pressure | 55 bar/hydr |
| Holding pressure | 32 bar |
| Holding pressure | 8 seconds |
| Back pressure | 6 bar |

The feed hopper of the molding machine was flushed with an inert gas. A slight over pressure was maintained to ensure an oxygen level below 1 vol % in feed hopper (oxygen level of about 0.02 vol % or less typically achieved).

In the control no inert gas was used; in Example 12 the inert gas was nitrogen; and in Example 13 the inert gas was a mixture of nitrogen and hydrogen gas (97 vol % $N_2$/3 vol % $H_2$). The plaques were evaluated for pits and insolubles. Results are shown in Table 7.

TABLE 7

| Examples | Inert Gas | Number of insolubles/60 grams | Reduction |
|---|---|---|---|
| Control | | 1685 | — |
| 11 | 100% $N_2$ | 1190 | 29% |
| 12 | 97 vol % $N_2$/3 vol % $H_2$ | 910 | 46% |

A significant reduction of number of insolubles was found by purging the feed hopper with inert gas, and particularly with purging with a mixture of nitrogen and hydrogen. As can be seen from Table 7, the product has less than about 1,500 insolubles per 60 grams (isol./60 g), with less than about 1,200 isol./60 g typical and about 1,000 isol./60 g or less preferred. This represents an improvement of conventional composition.

The present invention reduces pits by namely compounding under an inert atmosphere, flushing the poly(arylene ether) with an inert gas, operating the extruder with the atmospheric vent open, and/or adding up to 20 wt % of polyamide in the first compounding step. The beneficial effect of compounding under an inert atmosphere is clearly seen in Examples 1–3 where the number of pits per plaque was reduced from 20 in the control to 2.3 in Example 3. The number of insolubles showed a similar drop from 3294 in the control to 637 in Example 3. A comparison of Examples 4 and 5 clearly shows the benefit of flushing the poly(arylene ether) resin with nitrogen. Examples 4 and 5 are both compounded under an inert atmosphere but in Example 5 the poly(arylene ether) resin is flushed with nitrogen. The number of pits per plaque was further reduced by 1 in Example 5 when compared to Example 4 and the number of insolubles is reduced from 1151 in Example 4 to 500 in Example 5. The advantage of operating with the atmospheric vent is clearly seen in Example 11. Examples 6 through 9 demonstrate the utility of adding a portion of the polyamide at the main feeder as evidenced by a dramatic drop in the number of pits per plaque from the Control (20) to Example 8 (4.2). A similar trend is seen in the insolubles data. Thus, it is clear, especially to one skilled in the art, that each improvement to the process results in a decrease in the number of pits/insolubles and the combination of improvements results in a greater decrease in pits/insolubles.

Additionally, the improvements to the injection molding process may be used in combination with improvements to the process of making poly(arylene ether)-polyamide compositions or separately. The amount of carbonized particles formed during injection molding of poly(arylene ether)-polyamide polymer compositions was distinctly reduced when the feed hopper was flushed with an inert gas or mixture of gases and a slight over pressure of inert gas was maintained.

As a result of the process of the present invention, poly(arylene ether)-polyamide compositions can be produced having a significantly reduced number of carbon particles and/or insolubles. Namely, compared to a composition prepared without employing an inert atmosphere polyamide split-feeding, or air free resins, the poly(arylene ether)-polyamide composition comprises an about 50% or greater reduction of carbon particles, with about 75% or greater reduction preferred, about 85% or greater more preferred and about 90% or greater reduction especially preferred. Additionally, an about 50% or greater reduction in insolubles has been achieved with an about 70% or greater reduction preferred, about 80% or greater reduction more preferred, and an about 85% or greater reduction especially preferred.

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A process to produce a poly(arylene ether)-polyamide composition, comprising:
   creating and maintaining a substantially inert atmosphere in an extruder;
   introducing poly(arylene ether) resin to said extruder;
   compounding said poly(arylene ether); and
   adding polyamide to said compounded poly(arylene ether) and further compounding to form the poly(arylene ether)-polyamide composition.

2. The process to produce a poly(arylene ether)-polyamide composition of claim 1, wherein the poly(arylene ether)-polyamide composition comprises the reaction product of about 10 wt % to about 90 wt % poly(arylene ether) resin, about 90 wt % to about 10 wt % polyamide resin.

3. The process to produce a poly(arylene ether)-polyamide composition of claim 2, wherein the poly(arylene ether)-polyamide composition comprises about 30 wt % to about 60 wt % poly(arylene ether) resin, and about 60 wt % to about 30 wt % polyamide resin.

4. The process to produce a poly(arylene ether)-polyamide composition of claim 1, further comprising flushing the poly(arylene ether) resin with an inert gas.

5. The process to produce a poly(arylene ether)-polyamide composition of claim 4, wherein the inert gas is selected from the group consisting of nitrogen, hydrogen, helium, neon, argon, carbon dioxide, and mixtures comprising at least one of the foregoing gases.

6. The process to produce a poly(arylene ether)-polyamide composition of claim 1, wherein the poly(arylene ether)-polyamide composition further comprises impact modifiers, release agents, stabilizers, organic fillers, inorganic fillers, conductive agents, UV stabilizers, anti-oxidants, flame retardants, drip retardants, dyes, pigments, colorants, stabilizers, small particle minerals, antistatic agents, plasticizers, lubricants, or mixtures comprising at least one of the foregoing additives.

7. The process to produce a poly(arylene ether)-polyamide composition of claim 1, wherein said inert atmosphere is selected from the group consisting of nitrogen, helium, hydrogen, neon, argon, carbon dioxide and mixtures comprising at least one of the foregoing gases.

8. The process to produce a poly(arylene ether)-polyamide composition of claim 1, further comprising adding about up to about 20 wt % of polyamide resin to said extruder with said poly(arylene ether) resin.

9. The process to produce a poly(arylene ether)-polyamide composition of claim 1, wherein said poly(arylene ether) is selected from the group consisting of poly(arylene ether) and copolymers, graft copolymers, and ionomers thereof; block copolymers of alkenyl aromatic compounds, vinyl aromatic compounds and poly(arylene ether); and combinations comprising at least one of the foregoing polymers.

10. The process to produce a poly(arylene ether)-polyamide composition of claim 1, wherein said polyamide is selected from the group consisting of nylon-6, nylon-6,6, nylon-4, nylon-4,6, nylon-12, nylon-6,10, nylon 6,9, amorphous nylon, super tough nylons and combinations comprising at least one of the foregoing polyamides.

11. The process to produce a poly(arylene ether)-polyamide composition of claim 1, wherein said poly(arylene ether) resin is represented by the formula:

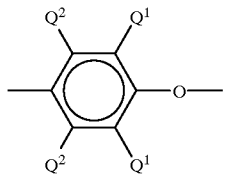

wherein each Q is a monovalent substituent individually selected from hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

12. The process to produce a poly(arylene ether)-polyamide composition of claim 1 further comprising adding a compatibility modifier with said poly(arylene ether) to form a mixture wherein said compatibility modifier is selected from the group consisting of polycarboxylic acids and their salts, polycarboxylic acid esters, polycarboxylic acid amides, quinones, liquid diene polymers, epoxy compounds, oxidized polyolefin wax, organosilane compounds, and combinations comprising at least one of the foregoing compatibility modifiers.

13. The process to produce a poly(arylene ether)-polyamide composition of claim 12, further comprising adding about up to about 20 wt % of polyamide resin to said mixture.

14. The process to produce a poly(arylene ether)-polyamide composition of claim 13, further comprising flushing the mixture with an inert gas.

15. The process to produce a poly(arylene ether)-polyamide composition of claim 14, wherein the inert gas is selected from the group consisting of nitrogen, hydrogen, helium, neon, argon, carbon dioxide, and mixtures comprising at least one of the foregoing gases.

16. The process to produce a poly(arylene ether)-polyamide composition of claim 14, wherein said mixture further comprises impact modifiers, release agents, stabilizers, organic fillers, inorganic fillers, conductive agents, UV stabilizers, anti-oxidants, flame retardants, drip retardants, dyes, pigments, colorants, stabilizers, small particle minerals, antistatic agents, plasticizers, lubricants, or mixtures comprising at least one of the foregoing additives.

17. The process to produce a poly(arylene ether)-polyamide composition of claim 13, using an atmospheric vent to vent said mixture.

18. The process to produce a poly(arylene ether)-polyamide composition of claim 1, using an atmospheric vent to vent said mixture.

19. The process to produce a poly(arylene ether)-polyamide composition of claim 1, further comprising pelletization.

20. The process to produce a poly(arylene ether)-polyamide composition of claim 19, further comprising underwater pelletization.

21. A process for producing a poly(arylene ether)-polyamide composition, comprising:
    combining poly(arylene ether) resin and up to about 20 wt % polyamide resin in said extruder to form a mixture;
    flushing said mixture with an inert gas;
    compounding said mixture; and
    adding additional polyamide resin to said compounded mixture and further compounding to form the poly(arylene ether)-polyamide composition.

22. The process to produce a poly(arylene ether)-polyamide composition of claim 21 further comprising adding a compatibility modifier to said mixture wherein said compatibility modifier is selected from the group consisting of polycarboxylic acids and their salts, polycarboxylic acid esters, polycarboxylic acid amides, quinones, liquid diene polymers, epoxy compounds, oxidized polyolefin wax, organosilane compounds and combinations comprising at least one of the foregoing compatibility modifiers.

23. The process to produce a poly(arylene ether)-polyamide composition of claim 22, wherein the inert gas is selected from the group consisting of nitrogen, hydrogen, helium, neon, argon, carbon dioxide, and mixtures comprising at least one of the foregoing inert gases.

24. The process to produce a poly(arylene ether)-polyamide composition of claim 21, wherein said mixture further comprises impact modifiers, release agents, stabilizers, organic fillers, inorganic fillers, conductive agents, UV stabilizers, anti-oxidants, flame retardants, drip retardants, dyes, pigments, colorants, stabilizers, small particle minerals, antistatic agents, plasticizers, lubricants, or mixtures comprising at least one of the foregoing additives.

25. The process to produce a poly(arylene ether)-polyamide composition of claim 24, using an atmospheric vent to vent said mixture said extruder further comprising an extruder with an atmospheric vent, wherein the vent is disposed between the poly(arylene ether) introduction point and the introduction point of the polyamide and operating with said vent open.

26. The process to produce a poly(arylene ether)-polyamide composition of claim 21, wherein the poly(arylene ether)-polyamide composition comprises about 10 wt % to about 90 wt % poly(arylene ether) resin and about 90 wt % to about 10 wt % polyamide resin.

27. The process to produce a poly(arylene ether)-polyamide composition of claim 26, wherein the poly (arylene ether)-polyamide composition comprises about 30 wt % to about 60 wt % poly(arylene ether) resin and about 60 wt % to about 30 wt % polyamide resin.

28. The process to produce a poly(arylene ether)-polyamide composition of claim 21, further comprising flushing the poly(arylene ether) resin with an inert gas.

29. The process to produce a poly(arylene ether)-polyamide composition of claim 28, wherein said inert atmosphere is selected from the group consisting of nitrogen, helium, hydrogen, neon, argon, carbon dioxide and mixtures comprising at least one of the foregoing inert gases.

30. A process for producing a poly(arylene ether)-polyamide composition, comprising:

combining poly(arylene ether) resin and about 5 wt % to about 10 wt % polyamide resin in said extruder to form a mixture;

compounding said mixture; and adding additional polyamide resin to said compounded mixture and further compounding to form the poly(arylene ether)-polyamide composition.

31. A process for producing a poly(arylene ether)-polyamide composition, comprising:

combining poly(arylene ether) resin and up to about 15 wt % polyamide resin in said extruder to form a mixture;

compounding said mixture; and adding additional polyamide resin to said compounded mixture and further compounding to form the poly(arylene ether)-polyamide composition.

32. The process to produce a poly(arylene ether)-polyamide composition of claim 8, further comprising adding up to about 15 wt % of said polyamide resin to said mixture.

33. The process to produce a poly(arylene ether)-polyamide composition of claim 32, further comprising adding about 5 wt % to about 10 wt % of said polyamide resin to said mixture.

34. The process to produce a poly(arylene ether)-polyamide composition of claim 22, further comprising combining up to about 15 wt % of said polyamide resin with said poly(arylene ether) resin to form said mixture.

35. The process to produce a poly(arylene ether)-polyamide composition of claim 34, further comprising combining about 5 wt % to about 10 wt % of said polyamide resin with said poly(arylene ether) resin to form said mixture.

* * * * *